(12) United States Patent
Cuoq et al.

(10) Patent No.: US 8,352,918 B2
(45) Date of Patent: Jan. 8, 2013

(54) METHOD AND SYSTEM FOR VERIFYING PROPERTIES OF A COMPUTER PROGRAM

(75) Inventors: Pascal Cuoq, Orsay (FR); Benjamin Monate, Bourg la Reine (FR)

(73) Assignee: Commissariat a l'Energie Atomique, Paris (FR)

( * ) Notice: Subject to any disclaimer, the term of this patent is extended or adjusted under 35 U.S.C. 154(b) by 537 days.

(21) Appl. No.: 12/524,467

(22) PCT Filed: Jan. 25, 2008

(86) PCT No.: PCT/EP2008/050901
§ 371 (c)(1),
(2), (4) Date: Dec. 11, 2009

(87) PCT Pub. No.: WO2008/095799
PCT Pub. Date: Aug. 14, 2008

(65) Prior Publication Data
US 2010/0115493 A1      May 6, 2010

(30) Foreign Application Priority Data
Jan. 26, 2007    (FR) ...................................... 07 00557

(51) Int. Cl.
*G06F 9/44* (2006.01)
*G06F 9/45* (2006.01)

(52) U.S. Cl. ........ 717/126; 717/127; 717/131; 717/141; 717/154

(58) Field of Classification Search ........................ None
See application file for complete search history.

(56) References Cited

U.S. PATENT DOCUMENTS

| | | | | |
|---|---|---|---|---|
| 6,029,002 | A * | 2/2000 | Afifi et al. | 717/131 |
| 6,275,976 | B1 * | 8/2001 | Scandura | 717/126 |
| 6,957,422 | B2 * | 10/2005 | Hunt | 717/127 |
| 7,284,274 | B1 * | 10/2007 | Walls et al. | 726/25 |
| 7,685,572 | B1 * | 3/2010 | Qiao | 717/126 |
| 7,703,075 | B2 * | 4/2010 | Das et al. | 717/126 |

(Continued)

OTHER PUBLICATIONS

Dimitra Giannakopoulou et al., Assumption Generation for Software Component Verification, IEEE, 2002, [Retrieved on Mar. 10, 2012]. Retrieved from the internet: <URL: http://www.mendeley.com/research/assumption-generation-software-component-verification-4/#> pp. 1-10).*

(Continued)

*Primary Examiner* — Don Wong
*Assistant Examiner* — Anibal Rivera
(74) *Attorney, Agent, or Firm* — Baker & Hostetler LLP

(57) ABSTRACT

A method and a system for verifying properties of a computer program is provided, pertaining to the validity of properties at program points by means of at least one forward analyser and one backward analyser. For each property, in an issuing phase an analyser issues to a centralizer module an assumption on the validity of the property at a point of the program, the centralizer module storing the assumption in a database with an attribute indicating the original analyser and a status indicating that the assumption needs to be verified; in a phase of verifying the assumption, stored in the database, a test analyser is selected to analyse the assumption in cooperation with the other analysers, the centralizer module determining analysers able to cooperate. The verification phase is iterated until all assumptions stored in the base have been analysed by at least one test analyser, a verified assumption being marked as valid.

17 Claims, 4 Drawing Sheets

U.S. PATENT DOCUMENTS

| | | | | |
|---|---|---|---|---|
| 7,793,273 | B2 * | 9/2010 | Mercer et al. | 717/126 |
| 7,823,135 | B2 * | 10/2010 | Horning et al. | 717/126 |
| 7,886,272 | B1 * | 2/2011 | Episkopos et al. | 717/127 |
| 2002/0040470 | A1 * | 4/2002 | Guthrie et al. | 717/126 |
| 2004/0088689 | A1 * | 5/2004 | Hammes | 717/154 |
| 2005/0166167 | A1 * | 7/2005 | Ivancic et al. | 716/5 |
| 2006/0020919 | A1 * | 1/2006 | King | 717/126 |
| 2006/0117302 | A1 * | 6/2006 | Mercer et al. | 717/131 |
| 2006/0190923 | A1 * | 8/2006 | Jubran | 717/104 |
| 2006/0253841 | A1 * | 11/2006 | Rioux | 717/127 |

OTHER PUBLICATIONS

Dimitra Giannakopoulou et al., Assume-guarantee Verification of Source Code with Design-Level Assumptions, IEEE 2004 0270/5257/04, [Retrieved on Sep. 16, 2012]. Retrieved from the internet: <URL: http://dl.acm.org/citation.cfm?id=998675.999426> 10 pages. (211-220).*

Annie T.T. Ying et al., Predicting Source Code Changes by Mining Change History, IEEE Sep. 2004, vol. 30 No. 9 [Retrieved on 2012-09-16]. Retrieved from the internet: <URL: http://ieeexplore.ieee.org/stamp.jsp?tp=&arnumber=1324645> 13 pages (574-586).*

Andrew Ireland et al., "An Integrated Approach to High Integrity Software Verification", Journal of Automated Reasoning, Sep. 29, 2006, pp. 379-410, vol. 36, No. 4, Kluwer Academic Publishers.

Maria Paola Bonacina, "A Taxonomy of Theorem-Proving Strategies", Artificial Intelligence Today—Lecture Notes in Computer Science; 2001, pp. 43-84, vol. 1600, Springer-Verlag Berlin Heidelberg.

Alan Bundy, "A Survey of Automated Deduction", Artificial Intelligence Today—Lecture Notes in Computer Science, 2001, pp. 153-174, vol. 1600, Springer-Verlag Berlin Heidelberg.

* cited by examiner

METHOD AND SYSTEM FOR VERIFYING PROPERTIES OF A COMPUTER PROGRAM

CROSS-REFERENCE TO RELATED APPLICATIONS

This application is a national stage of International Application No. PCT/EP2008/050901, filed Jan. 25, 2008, which claims priority to foreign French Application No. FR 07 00557, filed Jan. 26, 2007, the disclosure of each application is hereby incorporated by reference in their entirety.

BACKGROUND OF THE INVENTION

The present invention relates to a method and a system for verifying properties of a computer program.

It applies notably to all computer programs in the form of source codes whose properties, notably dependability, security and proper operation, one wishes to verify. It applies in particular in respect of critical computer programs.

There exist critical computer programs embedded for example in aerial and terrestrial transports and nuclear facilities. It is necessary, indeed obligatory, to ensure that these programs comply notably with properties of dependability, security and proper operation. Other properties can be verified. These properties are expressed on the source code of the program investigated.

Several procedures can be used to provide elements of confidence in critical programs by verifying properties about their source code. Two types of procedures are particularly known, test procedures and static analysis procedures.

Test procedures involve executing the program on a large number of inputs. As there are too many different inputs, some of them are selected, hoping that these are representative of all the behaviours of the program. These procedures may therefore afford only partial confidence in the program.

Static analysis procedures involve investigating the source code without executing it. Various static analysis procedures exist and provide guarantees about the behaviour of the program for all its inputs. In general this problem has no solution: it forms part of the class of undecidable problems. The existing procedures must therefore proceed by approximations. These approximations can be of two kinds: either they make it possible to give a subset comprising only definite errors, or they make it possible to give a super-set of potential errors. In the first case, the effect of the approximation is that certain errors may be omitted. In the second case, the analysis may indicate errors that the source code does not actually exhibit. Within the framework of the analysis of a critical code, consideration is generally given to the second family of approximations so as to have the possibility of being certain that no error remains in the source program investigated. Moreover, static analysis relies on formal modelling of the language used in the source program investigated. This modelling may not take into account certain aspects of the language for technical reasons. Because of these choices in the modelling, a given static analysis procedure may be incapable of processing certain parts of the source program to be investigated.

SUMMARY OF THE INVENTION

An aim of the invention is notably to alleviate the aforesaid drawbacks, by making it possible in particular to improve the static analysis procedures. For this purpose, the subject of the invention is a method for analysing the source code of a computer program, the verification pertaining to the validity of a set of properties at program points by means of at least one forward analyser and one backward analyser, comprising, for each property:

an issuing phase in which an analyser issues to a centralizer module an assumption on the validity of the property at a point of the program, the centralizer module storing the assumption in a database with an attribute indicating at least its original analyser and a status indicating that the assumption needs to be verified;

a phase of verifying the assumption, stored in the database, in which a test analyser is selected to analyse the assumption in cooperation with the other analysers, the centralizer module determining the analysers able to cooperate;

the verification phase being iterated until all the assumptions stored in the base have been analysed by at least one test analyser, a verified assumption being marked as valid.

Another subject of the invention is a system for verifying the source code of a computer program, the verification pertaining to the validity of a set of properties at program points, the said system comprising at least one forward analyser and one backward analyser, and comprising a centralizer module and a database, for each property:

in an issuing phase an analyser issues to the centralizer module an assumption about the validity of a property at a point of the program, the centralizer module storing the assumption in a database with an attribute indicating at least its original analyser and a status indicating that the assumption needs to be verified;

in a phase of verifying the assumption, stored in the database, a test analyser is selected to analyse the assumption in cooperation with the other analysers, the centralizer module determining the analysers able to cooperate;

the verification phase being iterated until all the assumptions stored in the base have been analysed by at least one test analyser, a verified assumption being marked as valid.

BRIEF DESCRIPTION OF THE DRAWINGS

Other characteristics and advantages of the invention will become apparent with the aid of the description which follows offered in relation to appended drawings which represent.

MORE DETAILED DESCRIPTION

Figure 1:
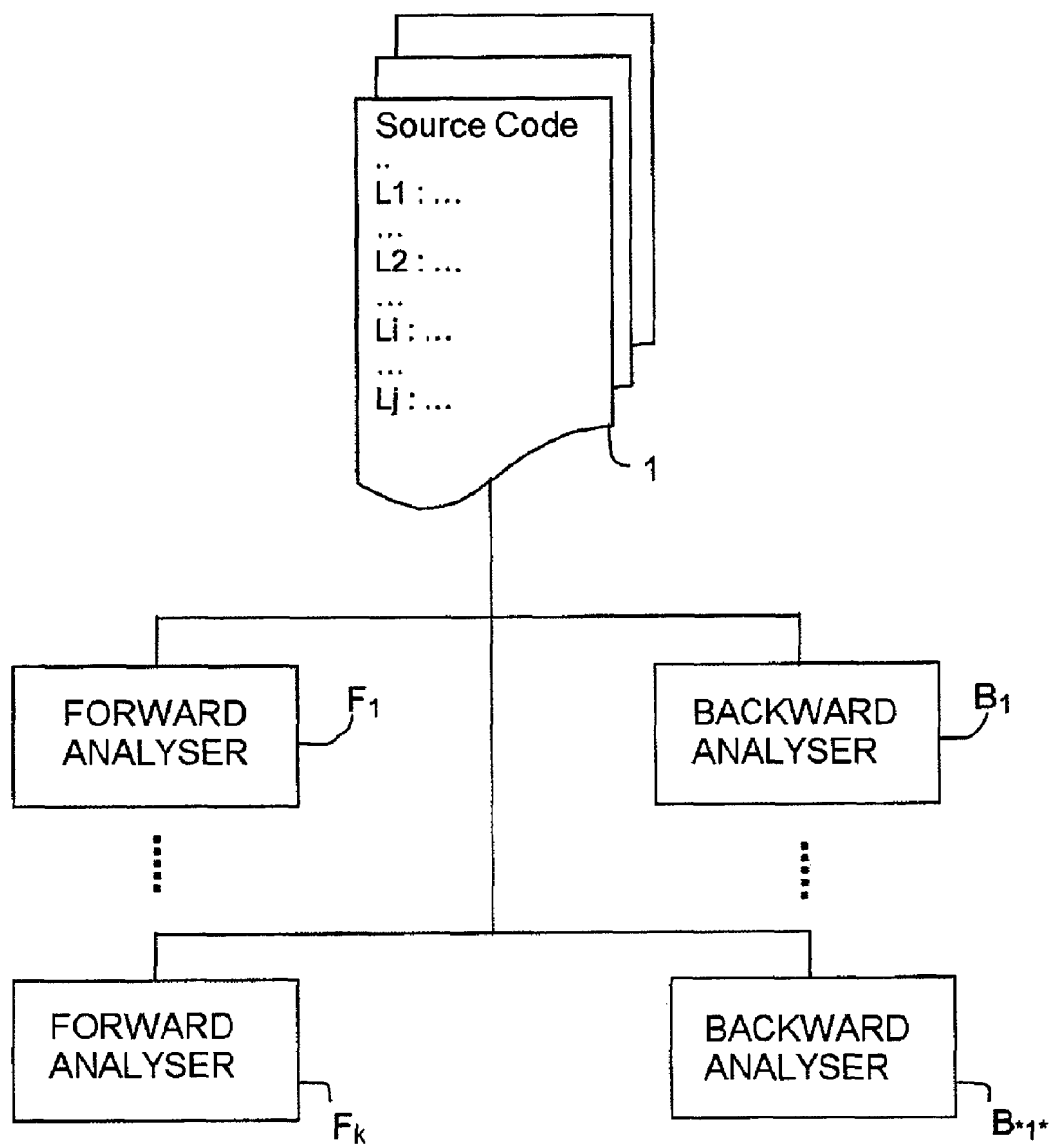
FIG. 1, an illustration of the operating principle of a static analysis procedure for the verification of a program.

FIG. 1 illustrates the operating principle of a system implementing a static analysis procedure. A set of analysers F1, Fk, B1, Bl is assigned to the analysis of properties of a computer program, at the level of its source code 1. Two types of analysers are used, at least one forward analyser F1, Fk and at least one backward analyser B1, Bl.

A forward analyser F1, Fk starts with the initial state of the analysed program 1 and, by forward propagation in the control flow graph starting from an input point, calculates at points of the program the states which can occur. This calculation is performed by taking account notably of the effects of the instructions of each step and by reducing the states that are propagated in the presence of conditional tests, of the "if", "then" or "else" type for example, in the source program. This reduction can also be made for prohibited operations detected in the source code of the analysed program. In this case, the results of the analyser rely on the assumption that these prohibited operations do not actually occur. The forward analyser is said to issue an assumption. This issuing of an assumption may reveal the limit of the analyser. It is indeed impossible for it to indicate whether or not a property P is verified at a program point Li.

A backward analyser B1, Bl works by starting from a given property P and from the program point Li at which it must be verified. The analyser traverses the control flow graph backwards, successively calculating at each point conditions which guarantee that the conditions associated with the previous point, the successor in the graph, are established. The analyser terminates either by encountering instructions which ensure that the property P at the point Li of the program is verified, or when it has reached the input point of the control flow graph. In the latter case, the remaining conditions form a precondition of the function and must be verified. These preconditions which remain to be verified may again highlight the limit of the analyser, this time backwards.

An analyser F1 issues an assumption since it is limited, that is to say it does not know how to indicate whether this assumption is true. According to the invention, all the other analysers F1, Fk, B1, Bl are turned to account to analyse an assumption issued by an analyser, be it forward F1, Fk or backward B1, Bl. Among all these other analysers, at least one may be able to indicate whether the assumption is true or false. The invention thus makes it possible to best utilize the performance and resources of the analysers present.

Figure 2:
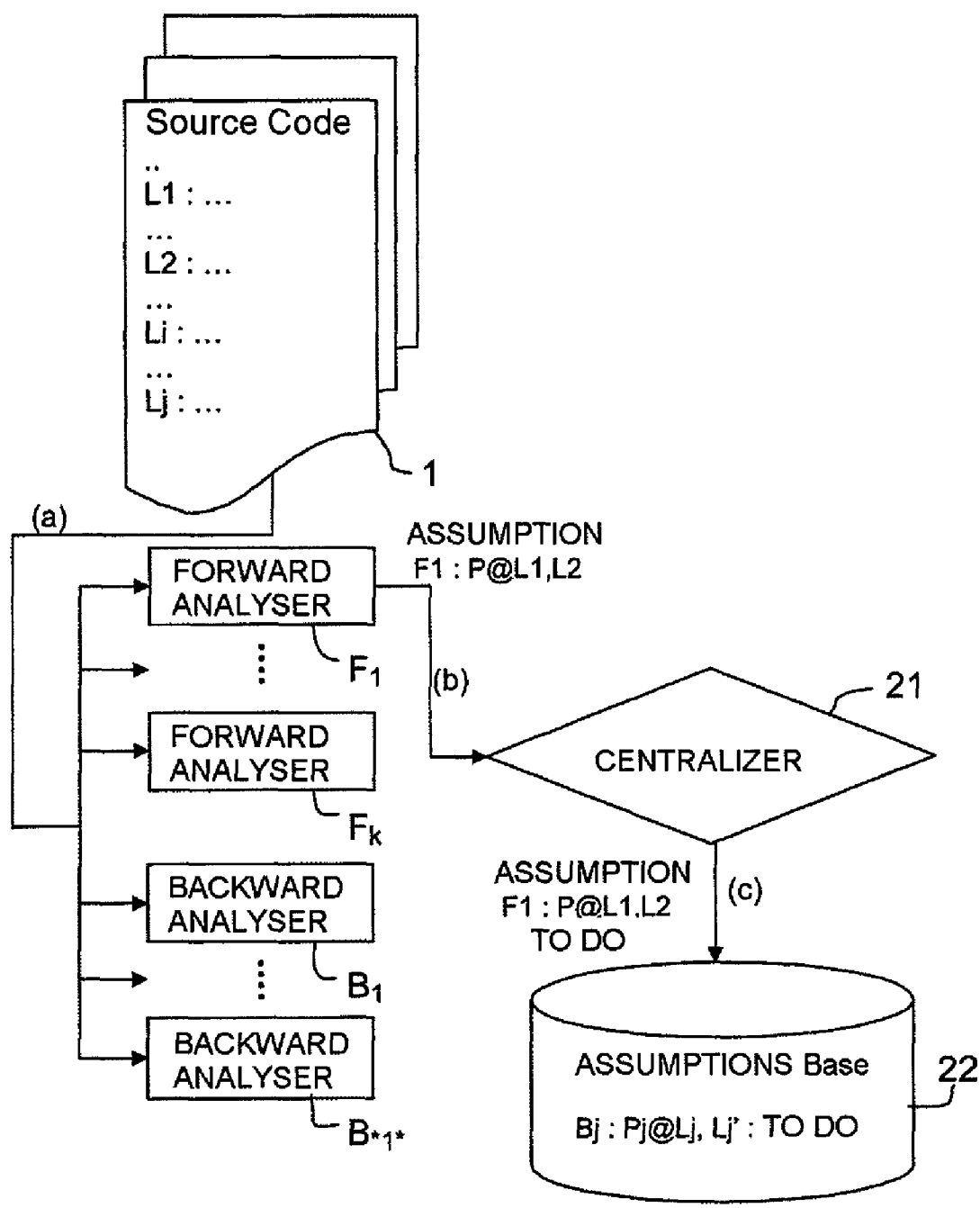
FIG. 2, an illustration of an operating phase of a system according to the invention corresponding to the issuing of an assumption by an analyser, the assumption pertaining to the validity of a property.

FIG. 2 illustrates an operating phase of a system according to the invention in the case of an issuing of an assumption by an analyser. By way of example the assumption is issued by a forward analyser. It could also be issued by a backward analyser.

The system comprises, in addition to the analysers F1, Fk, B1, Bl a centralizer module 21 and an assumptions base 22.

During this phase, the forward analyser F1 issues to the centralizer module 21 assumptions necessary for its operation. The centralizer module 21 stores these assumptions in the assumptions base 22 with a status specifying that these assumptions need to be verified. To indicate this status, the attribute "to do" can be assigned to each of these assumptions.

After having issued an assumption, the forward analyser F1 continues its work by admitting that this assumption that it has issued is verified. The verification of this assumption will be done in a subsequent verification phase. The analyser F1 may issue other assumptions which will follow the same path, to the base 22 via the centralizer module 21.

In a first step (a), the source code 1 of the program whose operation one wishes to verify is provided by an outside entity which has moreover decided to use the analyser F1. This outside entity can be a user or any other decision means, automatic or otherwise. The source code comprises program points L1, L2, Li, Lj to be verified. More particularly, an analyser analyses a property P at a program point Lj. A property P at a program point Lj will subsequently be denoted P@Lj.

In the example of FIG. 2, in a second step (b), in order to analyse the source code beyond the program point L2, the analyser F1 requires that the property P be true at the point L1 of the source code. That is to say that P@L1 is true, the program point L1 being accessible from the point L2 in the control flow graph of the source program investigated. The points L1 and L2 may optionally be equal. The analyser F1 therefore issues to the centralizer module 21 an assumption coded for example in the form F1: P@L1, L2. The analyser F1 demands that the property P be true at the point L1 without relying on an assumption accessible from the point L2, L1 being accessible from L2 in the control flow graph.

In a third step (c) the centralizer module 21 stores the assumption F1: P@L1, L2 in the assumptions base with the "to do" status. The centralizer module 21 will subsequently be able to recognize, for the assumption thus stored, its origin, the analyser F1, the property to be verified P and the program points concerned, L1 and L2. The assumptions base thus comprises a set of assumptions Bj: Pj@Lj, Lj' to be verified, that is to say having the "to do" status.

Figure 3:
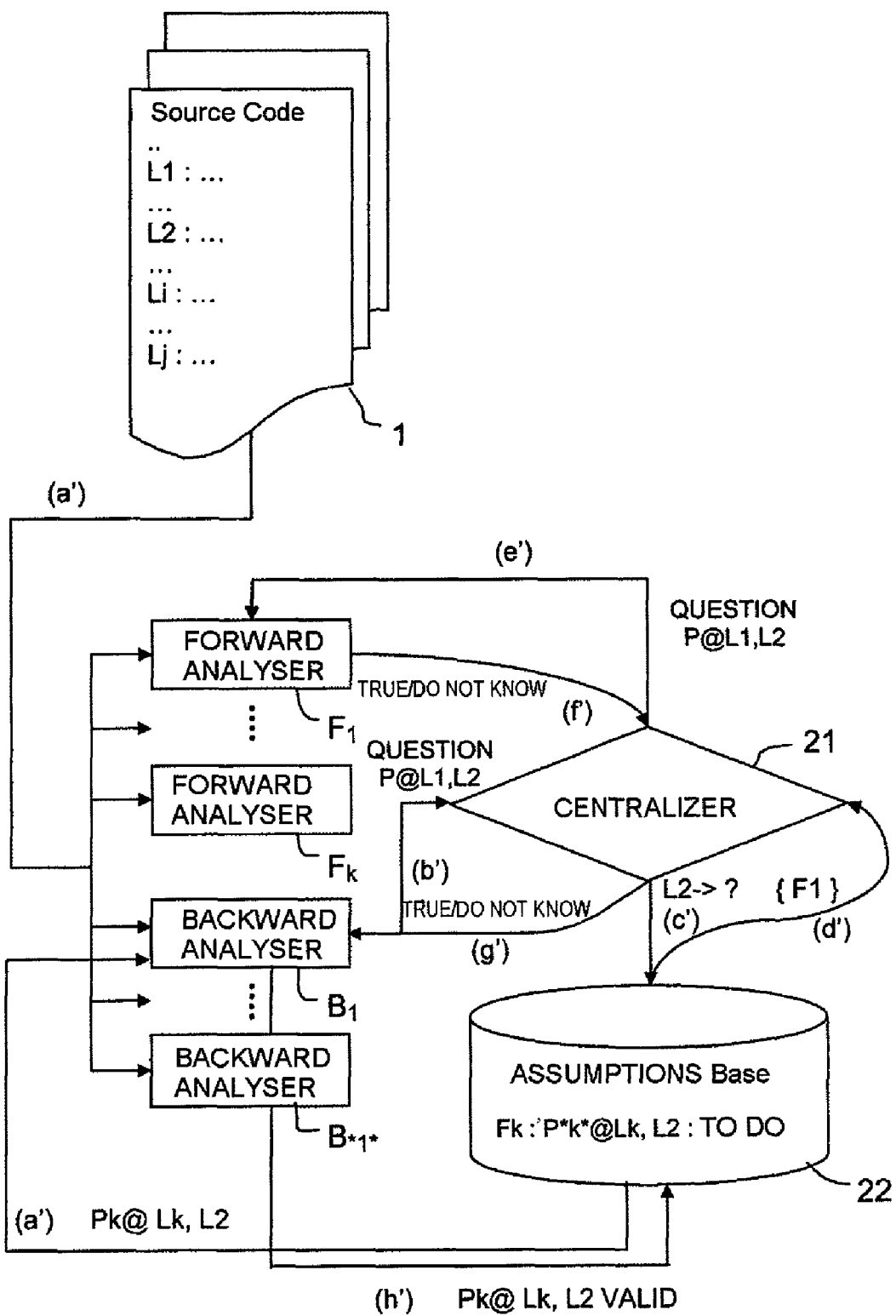
FIG. 3, an illustration of an operating phase of a system according to the invention corresponding to the verification of the assumptions issued.

FIG. 3 illustrates a following phase corresponding to the verification of the assumptions which are marked as "to do" in the assumptions base 22. An analyser has issued an assumption since it is limited, stated otherwise it does not have the means to indicate whether this assumption is true. According to the invention, all the other analysers F1, Fk, B1, Bl are turned to account, be they forward or backward, to verify the assumption by a process of cooperation.

An assumption is firstly issued to the centralizer module 21 which can re-issue it to other analysers so as to verify it.

By way of example, FIG. 3 illustrates the verification of an assumption by a backward analyser B1, but this assumption could be verified by the other analysers Fk, B1, Bl. The analyser B1 will therefore attempt to verify a "to do" assumption stored in the base 22. If it succeeds in verifying that the assumption is true, the latter is marked as valid. It can then no longer be called into question. To verify this assumption, the analyser B1 may be prompted to pose questions to other analysers. One question relates for example to the property P at the point L1. The question is then the following: is the property P verified at the point L1 without relying on an assumption made at a point accessible from the point P2. The response may be true, that is to say a positive response to the question. The response may also be "do not know", that is to say the interrogated analyser does not know how to respond to the question. This question will subsequently be denoted P@L1, L2.

In a first step (a') the analyser B1 is, for example, used to verify the property Pk@Lk on which the results of a certain analysis performed by an analyser Fk at points of the source code accessible from the point L2 and having the "to do" status in the assumptions base 22 rely.

In a second step (b'), the analyser B1 can optionally pose questions to the centralizer module 21 in the form P@L1, L2, that is to say is the property P at the program point L1 verified without the response to this question relying on an assumption marked "to do" in the assumptions base 22 and tied to a point accessible from the point L2.

In a third step (c'), the centralizer module 21 uses the assumptions base 22 to determine which analysers can respond to the question, that is to say without relying on an assumption marked "to do" and tied to a point accessible from the point L2. Through the latter requirement, the centralizer module 21 ensures the consistency of the verification process. It thus makes it possible to avoid the use in the verification chain of an assumption to verify this assumption itself. The centralizer module 21 interrogates only the analysers for which it can verify that they do not use this assumption. The assumptions base allows this verification since there is a relationship between each assumption and its original analyser, as indicated previously.

In a fourth step (d') the assumptions base 22 returns to the centralizer module 21 a set of analysers {Fi, . . . Fj} responding to its enquiry issued in the previous step (c'). In the example of FIG. 3, the assumptions base responds through the singleton {F1}.

In a fifth step (e') the centralizer module poses the question P@L1, L2 to the analyser F1.

In a sixth step (f') the analyser responds "true" or "do not know" to the centralizer.

In a seventh step (g') the centralizer module transmits this response, "true" or "do not know", to the analyser B1 which can make use thereof to continue the verification of the assumption Pk. The analyser can pose another question and recommence at step (b').

In a last step (h'), once the analyser has verified the validity of the assumption transmitted in the first step (a'), it modifies its status in the assumptions base by replacing the "to do" status by the "valid" status.

The process described for the analyser B1 is iterated if appropriate for other analysers. The process is completed when all the assumptions of the base 22 are validated, that is to say they are all assigned the "valid" status. In this case, all the assumptions can be considered to be correct and consequently the source code 1 can be considered to meet the dependability conditions for example.

If it has not been possible for at least one assumption to be verified by an analyser F1, Fk, B1, Bl it remains assigned the "to do" status. The source code 1 cannot be considered to meet the dependability conditions. Stated otherwise, the system does not make it possible to indicate whether or not the program is valid. By comparison with a system according to the prior art, there is nevertheless a large improvement in performance. This is because, through the collaboration of the analysers and of the centralizer module the invention greatly reduces the number of unverified assumptions.

A favoured order for selecting an analyser with a view to verifying a given assumption is not necessary. As soon as an analyser has been able to verify this assumption, the process is terminated for this assumption. If a selected analyser does not know how to respond, another analyser is selected.

Figure 4:
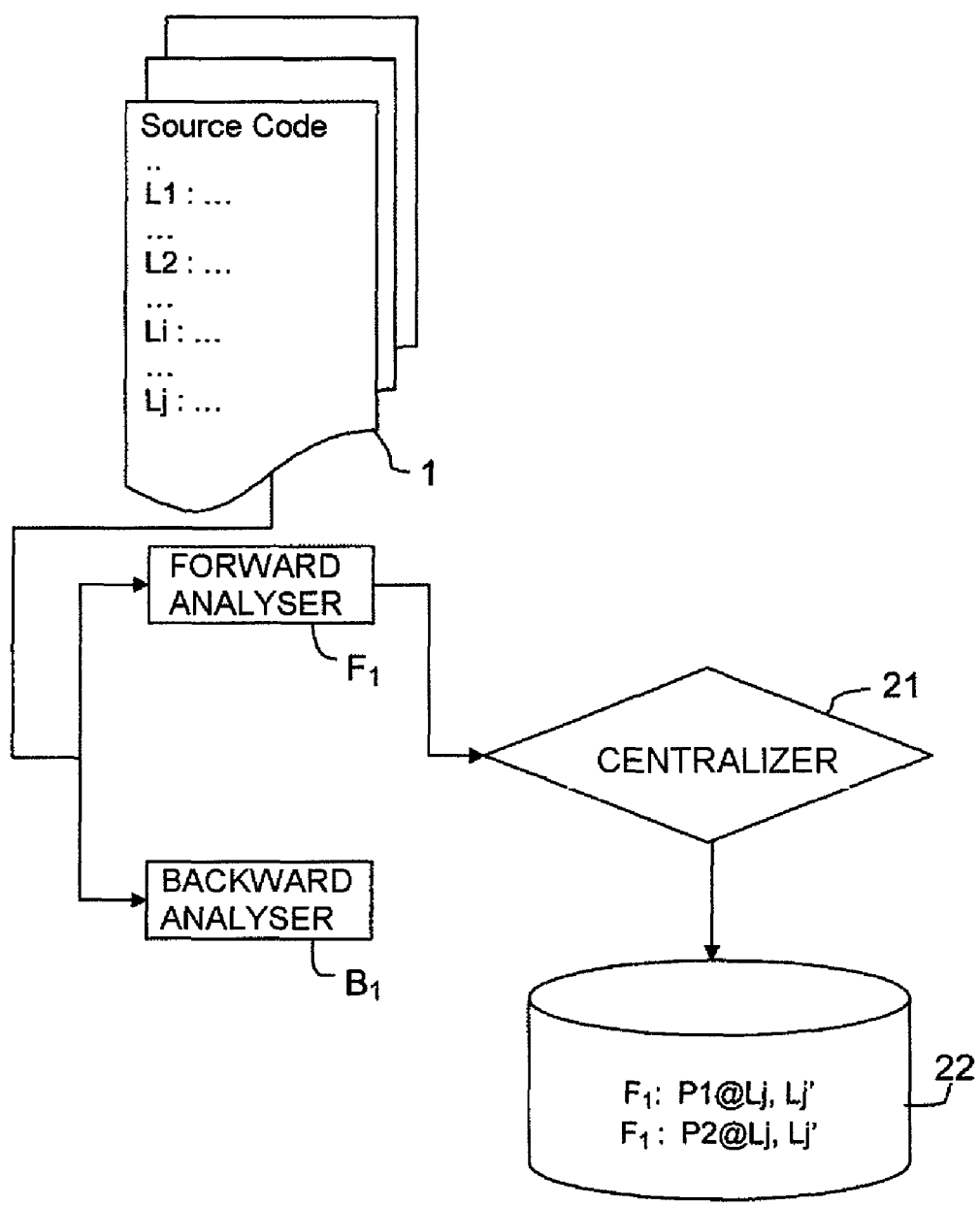
FIG. 4, an illustration of an exemplary application.

FIG. 4 illustrates an exemplary application. In this example the source code 1 is in the C language. The system comprises a single forward analyser F1 and a single backward analyser B1. The forward analyser F1 uses a calculation of intervals of values by forward abstract interpretation. This calculation is notably described in the document "Abstract interpretation: a unified lattice model for static analysis of programs by construction or approximation of fix points" by Patrick and Radhia Cousot, in Proc. 4th ACM Symposium on Principles of Programming Language, pp 238-252, 1977. This calculation reduces the states of the source code in the case of invalid operations in the C language and issues assumptions of the valid pointer and non-zero divisor type. In this case, the analyser F1 must notably verify the following two properties P1, P2 at determined points Li of the source code of the program:

P1: verify that the pointer is valid, that is to say that it points to an available memory area, authorized for writing and for reading;

P2: verify that the divisors are non-zero.

This amounts to ensuring that for the analysed program, there are in this program no zero divisors and no access to prohibited memory areas, liable to interrupt the program.

The backward analyser B1 uses a calculation by the weakest-precondition procedure notably described in the document "Assigning meaning to programs" by Robert W. Floyd in Mathematical Aspects of Computer Science, pp 19-32, 1967 as well as in the document "An axiomatic basis for computer programming" by C. Antony and R. Hoare in Communications of the ACM, 12: 576-580, 1969. This calculation makes it possible to prove, if appropriate, that the alarms are mock and uses the results of the forward analyser F1 to resolve the so-called "aliasing" questions, that is to say the problems of code having aliases. The phenomenon of "aliasing" corresponds notably to the fact that two names are used for one and the same memory area.

A limitation of the forward analyser F1 is that it does not know how to analyse a code which has aliases; on the other hand, analysis is fast and simple. The invention enables the forward analyser F1 to be made to collaborate with the backward analyser B1 thus increasing the performance of the whole.

The invention claimed is:

1. Method for analysing the source code of a computer program, the analysis pertaining to the validity of a set of properties at program points of the program by means of a plurality of analysers including at least one forward analyser and at least one backward analyser, the method comprising performing for each property in the set:

an issuing phase in which a first analyser included in the plurality of analysers issues to a centralizer module an assumption on the validity of the property at a point of the program, the centralizer module storing the assumption in a database with an attribute indicating at least the first analyser and a status indicating that the assumption needs to be verified;

a phase of verifying the assumption, stored in the database, in which a test analyser included in the plurality of analysers is selected to analyse the assumption in cooperation with the other analysers included in the plurality of analysers, the centralizer module determining which of the plurality of analysers are able to cooperate;

wherein the verification phase is iterated until all the assumptions stored in the database have been analysed by at least one test analyser, wherein a verified assumption is marked as valid, and wherein an analyser is determined to be able to cooperate if its cooperation does not rely on the use of the assumption itself.

2. Method according to claim 1, wherein when cooperation with an analyser does not make it possible to verify the assumption, the centralizer module selects another analyser.

3. Method according to claim 2, wherein the process of selection by the centralizer module is iterated until an analyser can cooperate with the test analyser or until all the analysers able to cooperate have been selected by the centralizer module.

4. Method according to claim 1, the phase of verifying comprises selecting another test analyser when the test analyser does not succeed in verifying the assumption.

5. Method according to claim 4, wherein the selecting another test analyser is iterated until a test analyser can verify the assumption or until all of the plurality of analysers have been selected.

6. Method according to claim 1, wherein in the phase of verifying comprises an analyser cooperating with the test analyser by responding to a question relating to the property at the program point, and the test analyser posing the question to the centralizer module.

7. Method according to claim 2, further comprising the test analyser asking whether the property at the program point is verified without the response to this question relying on an assumption to be verified in the base, this assumption being tied to a point which is accessible from another point of the program.

8. Method according to claim 6, wherein the centralizer module poses the question to an analyser able to cooperate and transmits the response to the test analyser which uses this response to verify the assumption.

9. Method according to claim 1, wherein a program is considered to be valid when all the assumptions stored in the database are marked as valid.

10. An apparatus for verifying the source code of a computer program, the verification pertaining to the validity of a set of properties at program points of the program, the system comprising
   a plurality of analysers including at least one forward analyser and at least one backward analyser;
   a centralizer module; and
   a database, and
   wherein for each property in the set:
   in an issuing phase a first analyser included in the plurality of analysers issues to the centralizer module an assumption about the validity of a property at a point of the program, the centralizer module storing the assumption in a database with an attribute indicating at least the first analyser and a status indicating that the assumption needs to be verified; and
   in a phase of verifying the assumption, stored in the database, a test analyser included in the plurality of analysers is selected to analyse the assumption in cooperation with the other analysers included in the plurality of analysers, the centralizer module determining which of the plurality of analysers are able to cooperate;
   wherein the verification phase is iterated until all the assumptions stored in the database have been analysed by at least one test analyser,
   wherein a verified assumption is marked as valid, and
   wherein the centralizer module determines that an analyser is able to cooperate if its cooperation does not rely on the use of the assumption itself.

11. The apparatus according to claim 10, wherein when cooperation with an analyser does not make it possible to verify the assumption, the centralizer module selects another analyser.

12. The apparatus according to claim 11, wherein the centralizer module repeats the selection process until an analyser can cooperate with the test analyser or until all of the plurality of analysers have been selected by the centralizer module.

13. The apparatus according to claim 10, wherein when a test analyser does not succeed in verifying the assumption, another analyser is selected.

14. The apparatus according to claim 13, wherein the process for selecting the test analyser is iterated until a test analyser can verify the assumption or until all the available analysers have been selected.

15. The apparatus according to claim 10, further comprising:
   a forward analyser using a calculation of intervals of values by forward abstract interpretation, and
   a backward analyser using a calculation by the weakest-precondition procedure.

16. The apparatus according to claim 15, wherein the apparatus verifies at least the following two properties P1, P2 at determined points of the source code of the program:
   P1: verify that a pointer is valid, such that the pointer points to an available memory area which is authorized for writing and for reading; and
   P2: verify that divisors are non-zero.

17. The apparatus according to claim 10, wherein a program is considered to be valid when all the assumptions stored in the database are marked as valid.

* * * * *